United States Patent [19]

Bernhardt

[11] 4,361,681
[45] Nov. 30, 1982

[54] POLYETHYLENE TEREPHTHALATE HAVING A REDUCED ACETALDEHYDE GENERATION RATE

[75] Inventor: John C. Bernhardt, Stow, Ohio

[73] Assignee: The Goodyear Tire & Rubber Company, Akron, Ohio

[21] Appl. No.: 203,095

[22] Filed: Nov. 3, 1980

[51] Int. Cl.³ .................. C08G 63/18; C08G 63/16
[52] U.S. Cl. .................. 525/444; 528/305; 528/307; 528/309
[58] Field of Search .............. 528/305, 309, 307; 525/444

[56] References Cited

U.S. PATENT DOCUMENTS 3,932,358  1/1976  de Cleur et al. .................. 260/75 N
4,020,049  4/1976  Rinehart .............................. 528/274
4,263,425  4/1981  Rothe ................................... 528/309

Primary Examiner—Allan Lieberman
Assistant Examiner—Pat Short

Attorney, Agent, or Firm—Bruce Hendricks

[57] ABSTRACT

This invention relates to a high molecular weight polyethylene terephthalate composition comprised of a plurality of polyester chains wherein a substantial number of said chains have at least one end group corresponding to a formula selected from the group consisting of

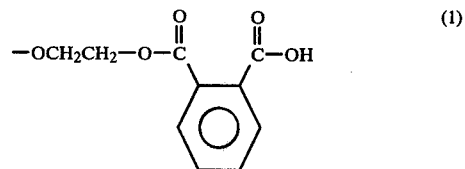

and

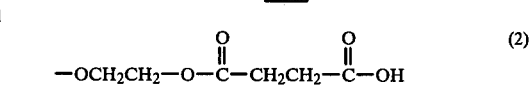

said composition having a reduced acetaldehyde generation rate.

11 Claims, No Drawings

POLYETHYLENE TEREPHTHALATE HAVING A REDUCED ACETALDEHYDE GENERATION RATE

TECHNICAL FIELD

The present invention relates to an improved thermoplastic polyester resin useful in the manufacture of food packaging products such as plastic beverage bottles, films and the like. More particularly, the invention relates to high molecular weight polyethylene terephthalate exhibiting a reduced tendency to generate acetaldehyde. Most particularly, the invention relates to high molecular weight polyethylene terephthalate comprised of a plurality of polyester chains, a substantial number of said chains having beta-hydroxyethyl end groups wherein said end groups have been reacted or capped with a diacid anhydride selected from the group consisting of succinic anhydride and phthalic anhydride.

BACKGROUND OF THE INVENTION

It is well-known that polyethylene terephthalate has gained wide acceptance as a thermoplastic material useful in the manufacture of food packaging products and in particular for one-half gallon and two liter carbonated beverage bottles. In the main, this acceptance has been due to the fact that polyethylene terephthalate, of all the thermoplastic materials available for this application, has the best overall balance of properties such as impact strength, resistance to creep under pressure, low permeability to carbon dioxide and high clarity and gloss.

It is also known that polyethylene terephthalate can undergo degradation during its preparation and conversion into these bottles with the evolution of acetaldehyde, a flavoring agent occurring naturally in many foodstuffs. To a large extent acetaldehyde formation is a result of the thermal scission of beta-hydroxyethyl groups situated on the ends of the polyester chains and to a lesser extent scission of ester linkages to form vinyl ester ends which then can react with the beta-hydroxyethyl end groups to form acetaldehyde. Ultimately, the acetaldehyde becomes entrained in the matrixes of the polyester and the bottles made therefrom and if present in sufficient quantities can adversely affect the taste of the packaged beverage as it diffuses from the bottle into the beverage. Generally, with respect to the one-half gallon and two liter size bottles, the amount of acetaldehyde generated can be maintained at levels insufficient to affect the taste of the packaged beverage through careful control of the polyester and bottle manufacturing processes. However, for smaller sized bottles such as those of one liter capacity or less, control of the manufacturing processes alone cannot achieve the even lower levels of acetaldehyde required for these applications.

DISCLOSURE OF THE INVENTION

In light of the above, the present invention provides for high molecular weight polyethylene terephthalate polyester compositions having reduced acetaldehyde generation rates. In particular, the present invention provides for high molecular weight polyethylene terephthalate compositions having an intrinsic viscosity of at least 0.4 deciliters per gram as determined in a 60/40 phenol tetrachloroethane mixed solvent at 30° C., said polyethylene terephthalate polyester compositions comprising a plurality of polyester chains, a substantial number of said chains having at least one end group corresponding to the formula selected from the group consisting of

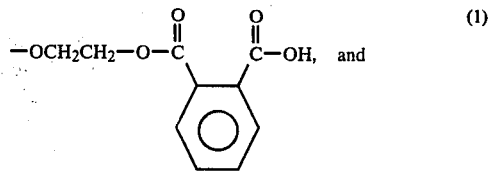

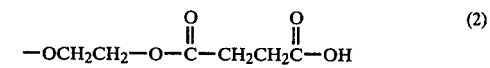

wherein said end groups are derived from the reaction between the beta-hydroxyethyl end groups of the polyester chains in a polyethylene terephthalate and a diacid anhydride selected from the group consisting of phthalic anhydride and succinic anhydride.

The initial polyethylene terephthalate from which the improved polyethylene terephthalate polyester compositions of the present invention are derived is prepared in accordance with conventional and known methods which are not a part of this invention. Thus, the initial polyethylene terephthalate may be prepared by either the transesterification of a mixture of dimethylterephthalate and ethylene glycol or the esterification of a mixture of terephthalic acid and ethylene glycol followed by subsequent polycondensation of the respective reaction products. A particularly useful prior art process for preparing the initial polyethylene terephthalate employed to prepare the improved compositions of this invention is that described in U.S. Pat. No. 4,020,049, the teachings of which are incorporated herein by reference.

In preparing the improved polyethylene terephthalate compositions of the present invention from about 0.1 to about 10.0 equivalents of either the phthalic anhydride or succinic anhydride are added to and reacted with the beta hydroxyethyl end groups of the initial polyethylene terephthalate. Since generally it is highly desirable to react all the beta hydroxyethyl end groups of said initial polyester, preferably from about 0.5 to about 2.5 equivalents of the anhydride is added with a highly preferred amount being approximately 1.0 to 2.0 equivalents. The precise amount of anhydride used will depend on the beta-hydroxyethyl end group concentration of the initial polyester as determined by its intrinsic viscosity and carboxyl content.

To ensure complete reaction of the phthalic or succinic anhydride with all the beta-hydroxyethyl end groups of the initial polyethylene terephthalate, said reaction should be carried out at a temperature of at least the melting point of the initial polymer which for high molecular weight polyethylene terephthalate ranges from about 255° C. to about 262° C. Thus, the reaction temperature will range from at least about 255° C. to about 300° C. and preferably from about 260° C. to about 285° C.

The addition of the phthalic or succinic anhydride to and reaction with the initial polyethylene terephthalate polymer may be carried out at any convenient period in time. Therefore, the anhydrides may be added to and reacted with said polyester at the end of the polymerization or formation step of the polyester. They may also be added at some later point in time such as during a physical precoating step of said polyester followed by subsequent reaction in an extrusion apparatus.

As noted hereinabove the improved polyethylene terephthalate compositions constituting the present invention will be of high molecular weight, i.e. have intrinsic viscosities of at least 0.4 and preferably from about 0.7 to 1.1 deciliters per gram. Thus, these compositions are quite suitable for use in the manufacture of various products and particularly for use in the manufacture of carbonated beverage bottles, and because of the reduced tendency for these compositions to generate acetaldehyde decomposition product, are especially suited to the manufacture of carbonated beverage bottles of one liter capacity or less. The invention will be better understood by reference to the following examples:

EXAMPLES 1-2

Two samples of end-capped polyethylene terephthalate resin representative of the compositions constituting the present invention were prepared and tested as follows:

Into each of three metal containers were weighed three pounds (~1.36 kilograms) of Cleartuf® 7202C, a pelletized polyethylene terephthalate resin having an intrinsic viscosity (I.V.) of 0.72 and available commercially from The Goodyear Tire & Rubber Company for use in the manufacture of one-half gallon and two liter beverage bottles. The three samples were then placed in a vacuum oven and heated for a period of 16 hours at 150° C. under ~1 millimeter of mercury pressure. At the end of this time, one of the containers was sealed pending further processing of this resin sample as a control. To another of these samples was added 2 equivalent (2 weight percent) of succinic anhydride and to the final sample were added 2 equivalent (3 weight percent) of phthalic anhydride. The containers housing the samples with the added anhydrides were then sealed and placed on a roller mill for ten minutes to ensure complete mixing of the polyester and the anhydrides.

Each of the three samples was then extruded (employing a 1″ Killian extruder) into a ribbon, cooled and diced.

The acetaldehyde content of the diced polymer and its acetaldehyde generation rate were then measured. The acetaldehyde content was measured by introducing a 4.0 gram sample of the appropriate polymer into a glass culture tube. The tube was then flushed with nitrogen and capped with a punched metal cap fitted with a butyl rubber disk and a teflon liner. The tube was then heated to 235° C. for 20 minutes in a heated thermostatically controlled aluminum block. After cooling the tube in ice water for 10 minutes and at room temperature for 15-30 minutes, an internal standard (4 μl of 0.5% propionaldehyde in propanol) was then introduced into the culture tube. After heating to 50° C. for 5 to 10 minutes a 1.0 ml. aliquot of headspace gas is removed and injected into a gas chromatograph for analysis.

The acetaldehyde generation rate was measured by heating three 0.5 gram samples of polymer, which had been dried at 140° C. and 1 mm. Hg for 16 hours, to 280° C. for 10, 20 or 30 minutes. The slope of a plot of the acetaldehyde generated versus the heating time gave the generation rate directly.

Pertinent data for all the samples is set forth in Table I below.

TABLE I

| Example No. | Additive | I.V. | Acetaldehyde Content[a] | Generation Rate[b] |
|---|---|---|---|---|
| Control | None | 0.63 | 78.3 | 4.8 |
| 1 | Succinic Anhydride | 0.67 | 24.9 | 1.2 |
| 2 | Phthalic Anhydride | 0.60 | 34.6 | 1.9 |

[a] Content in parts per million parts resin measured at 235° C.
[b] Generation Rate in parts per million parts resin measured at 280° C.

From the above Table 1, the improvement provided by the modified polyethylene terephthalate compositions of the present invention over that of the commercially available polyethylene terephthalate is quite obvious. In terms of percentages the succinic anhydride capped composition provided a 68 and 75 percent improvement respectively in acetaldehyde content and generation rate over that of the control sample. For the phthalic anhydride capped composition 56 and 60 percent improvements respectively in acetaldehyde content and generation rate were achieved.

EXAMPLES 3-6

Four additional samples of end-capped polyethylene terephthalate resins representative of the present invention were prepared, extruded into parisons and then blown into 64 ounce beverage bottles which were then tested for headspace acetaldehyde content as follows:

Three hundred pounds (~136 kilograms) of the same Cleartuf® 7202C resin used in Examples 1 and 2 above were dried in a ten cubic foot blender dried at 150° C. and 0.3 millimeter of mercury pressure for a period of 10 hours. On completion of the drying cycle the resin was discharged into fifteen five gallon metal containers (20 pounds per container). To 8 of these containers were immediately added either one to two equivalents (1 to 3 weight percent) of either the succinic anhydride or phthalic anhydride. The remaining containers of samples were retained for control purposes. All of the containers were tightly sealed and those containing the resin samples with added anhydride placed on roller mills to ensure good mixing. The samples were thus allowed to cool to ambient temperatures prior to their being extruded into bottle parisons.

Once the samples, including the 7 containers of control resin, were completely cooled a series of parison molding trials were carried out to convert all of the resin into bottle parisons. These molding trials were accomplished on a Cincinnati-Milacron 270 metric ton molding machine equipped with a four cavity mold. The amorphous parisons produced in this machine were then transferred to a blowing machine where they were reheated to a temperature of approximately 90° C. and blown to produce biaxially oriented beverage bottles of 64 ounce capacity.

In order to determine the amount of acetaldehyde in the bottle headspace, which provides a relative measure of the acetaldehyde content in the bottle matrix, the following test was conducted:

Immediately following the blowing of each bottle, the bottle was allowed to cool, purged with nitrogen and capped. The bottle was then stored and allowed to equilibrate to room temperature (22°±1.5° C.) for 24 hours. At the end of this time an internal standard comprising a 0.5 percent propionaldehyde in 1-propanol solution was injected into the bottle and the bottle placed in an oven at 50° C. for a period of time to effect a thermal mixing of the gases. Then a 5.0 ml. aliquot of the gases in the bottle were removed by means of a gas syringe and injected into a gas chromatograph for analysis.

Data resulting from the above testing of bottles prepared from the control resins mixed and reacted with the succinic and phthalic anhydrides are set forth in Table II below:

TABLE II

| Example No. | Additive | Amount of Additive | | Acetaldehyde[a] µg/liter | Percent Reduction |
|---|---|---|---|---|---|
| | | Equivalents | Wt. % | | |
| Control | None | — | — | 4.0 | — |
| 3 | Succinic Anhydride | 1.0 | 1.0 | 2.1 | 30 |
| 4 | Succinic Anhydride | 2.0 | 2.0 | 1.2 | 70 |
| 5 | Phthalic Anhydride | 1.0 | 1.5 | 2.5 | 17 |
| 6 | Phthalic Anhydride | 2.0 | 3.0 | 2.2 | 45 |

[a]Amount of acetaldehyde, in microgram per liter, in the bottle headspace measured after 24 hours of storage at 22 ± 1.5° C.

The data from the above examples demonstrate the improvement provided by the modified polyethylene terephthalate over that of conventional polyethylene terephthalate.

While certain representative embodiments and details have been shown for purposes of illustrating the invention, it will be apparent to those skilled in this art that various changes and modifications may be made therein without departing from the spirit and scope of the invention.

I claim:

1. A high molecular weight polyethylene terephthalate polyester composition having an intrinsic viscosity of at least 0.4 deciliters per gram as determined in a 60/40 phenol/tetrachloroethane mixed solvent; said composition comprising a plurality of polyester chains, a substantial number of said chains having at least one end group corresponding to a formula selected from the group consisting of

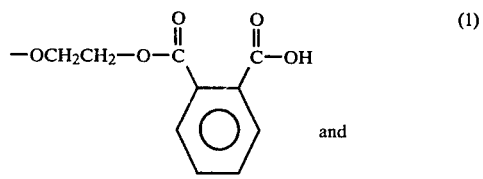

and

2. A polyester composition according to claim 1 wherein a substantial number of the chains therein have at least one end group corresponding to the formula:

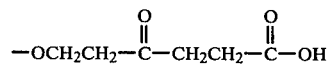

3. A polyester composition of claim 1 having an intrinsic viscosity ranging from about 0.7 to about 1.1.

4. A polyester composition according to claim 1 wherein said composition is derived from the reaction of high molecular weight polyethylene terephthalate having an intrinsic viscosity of at least 0.4 and comprised of a plurality of polyester chains, a substantial number of said chains having at least one beta hydroxyethyl end group and a diacid anhydride selected from the group consisting of phthalic anhydride and succinic anhydride.

5. A polyester composition according to claim 4 wherein the polyethylene terephthalate is reacted with from about 0.1 to about 10 equivalents of the diacid anhydride and preferably from about 0.5 to 2.5 equivalents of the diacid anhydride.

6. A polyester composition according to claim 5 wherein the polyethylene terephthalate is reacted with from 1.0 to 2.0 equivalents of the diacid anhydride, and wherein said intrinsic viscosity is from about 0.7 to about 1.1 dl/g.

7. A polyester composition according to claim 6 wherein the diacid anhydride is succinic anhydride.

8. A polyester composition according to claims 1, 2, or 3 wherein said substantial number of said chains having said end group thereon were formed at a reaction temperature of from about 255° C. to about 300° C.

9. A polyester composition according to claim 8 wherein said composition is in the form of a beverage bottle.

10. A polyester composition according to claims 5, 6 or 7 wherein said reaction is carried out at a temperature of from about 255° C. to about 300° C.

11. A polyester composition according to claim 10, wherein said polyester is in the form of a beverage bottle.

* * * * *